United States Patent Office 3,244,530
Patented Apr. 5, 1966

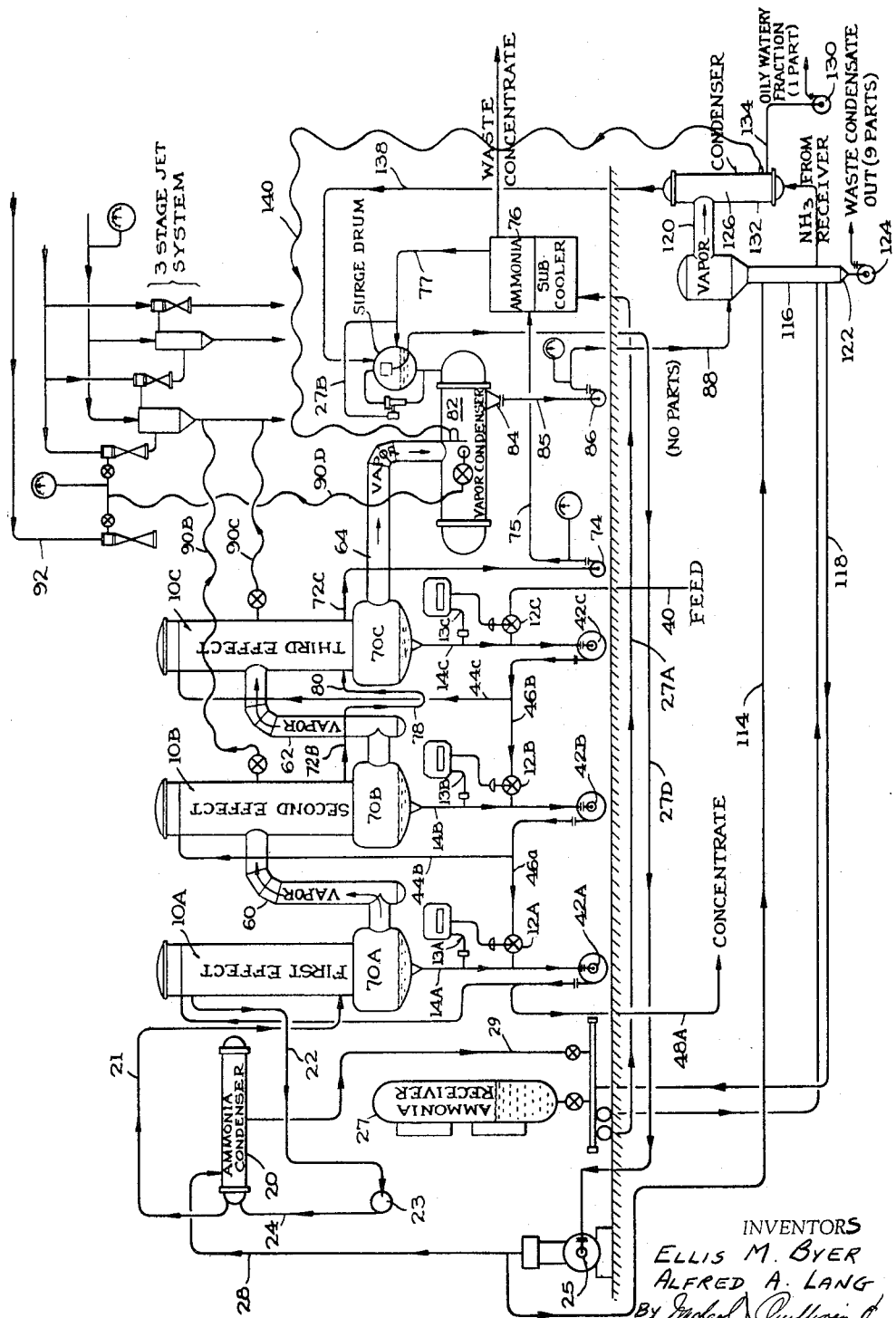

3,244,530
RECOVERING AROMATICS FROM
COFFEE EXTRACT
Ellis M. Byer, Albany, Oreg., and Alfred A. Lang, Winter Haven, Fla., assignors of one-third to General Foods Corporation, White Plains, N.Y., a corporation of Delaware
Filed Jan. 13, 1964, Ser. No. 342,842
The portion of the term of the patent subsequent to Jan. 21, 1981, has been disclaimed
8 Claims. (Cl. 99—71)

This application is a continuation-in-part of Serial No. 244,235 filed December 3, 1962, now United States Patent 3,118,775 which was a division of Serial No. 859,885 filed December 16, 1959, now abandoned.

The present invention relates to the production of flavor-enhanced coffee concentrates and, more particularly, to a process for the recovery from coffee extracts of volatile constituents useful for such enhancement.

It is an object of the present invention to provide a process whereby a volatile flavor fraction can be recovered from coffee extract in a simple and practical manner whereby concentrates of these extracts can be fortified with a flavor which they otherwise would not offer.

A specific object of the invention is to provide means whereby a high yield of a desired flavor fraction can be recovered simply without employing sophisticated plant equipment.

A still further object of the invention is the recovery of aromatic essences from coffee extracts in a condition whereby such essences can be restored to a concentrate and will offer to the reconstituted extract desired flavors even after prolonged storage.

Heretofore, it has been proposed to flavor-enhance concentrates by recovering most of the volatile flavor-producing constituents evaporated in the course of concentrating them. These constituents have various high and low boiling points. Thus, the art has been concerned in the past with the problems encountered in collection of all or most of these constituents. Suggested procedures have called for condensation, absorption, or other means for separation and collection of volatile essences, including esters, alcohols, aldehydes and other organic constituents calling for employment of a wide range of temperatures and pressures. Hence, it has been proposed to collect the volatile essences produced in the course of partial evaporation of an extract by means of multi-stage condensers at progressively reduced temperatures; for example, it has been proposed to employ a first-stage condensation above 32° F., a second-stage condensation below 32° F. in the neighborhood of a cold brine solution, and a third-stage condensation in neighborhoods less than —130° F. Clearly, such collection techniques are wasteful of expensive refrigerants such as liquid nitrogen, liquid air, and the like, and require complex condensate handling means which limit the applicability of such procedures on a wide scale in the extract concentration art. Moreover, such collection techniques involve the recovery of a large quantity of low molecular weight gases such as nitrogen, carbon dioxide, oxygen and other non-condensables which have a high diffusivity, create a high velocity and hinder the ability to condense the desired volatile essences on a practical scale.

Others in the art have suggested procedures whereby flavor values produced in the course of a partial evaporation of an extract are condensed at less reduced temperatures; here also, however, the prior art workers have mainly been concerned with the collection of as much as possible of these volatile constituents, including the more volatile materials and, as a consequence, have suggested the use of relatively complex packed fractionating columns, singly or in series. Such means generally place a substantial burden upon plant investment and operation and have not been found to produce an adequate yield or quality of flavoring material for use in fortification of concentrates. In the main, such techniques have been concerned with the recovery of constituents which boil at temperatures lower than the boiling point of water, and hence have not involved the recovery as well of constituents which boil at temperatures higher than the boiling point of water. Although low boiling constituents offer some fragrance reminiscent of unconcentrated extract, they are recovered at only a minor relatively inconsequential level such that their use in large quantities on a commercial basis is impractical.

The present invention provides a procedure whereby a high yield of useful volatile flavoring constituents can be recovered in a practical concentration for subsequent use in a manner which satisfies the aforementioned objects. Advantageously and unexpectedly this specific flavor fraction is recovered under only moderately reduced working temperatures and, surprisingly, is isolated from volatile fractions heretofore considered commercially useless and, hence, discarded. The procedure of the present invention is not complicated, therefore, by the use of drastically reduced condensation temperatures, can be combined with existing plant installations at a relatively small additional capital investment, and in use does not place an undue burden on plant production requirements.

The present invention is applicable to a variety of extracts which range in their sensitivities to operating temperatures. Indeed, the term "extract" as it is employed herein and in the accompanying claims is intended to apply to all types of coffee extracts and is typified by the water extract of roasted and ground coffee containing ingredients which provide desired essences, esters, alcohol, aldehydes, and other organic constituents recoverable by the invention.

The present invention recovers the aforesaid specific fraction of volatile constituents from extracts by a series of steps, which comprise:

(a) causing the extract to flow rapidly, preferably in a thin, continuous film over a heat exchange surface which is under a substantially reduced subatmospheric pressure, typically less than 1½" of mercury, in a closed system to partially concentrate the extract by separating it into a major portion of dearomatized concentrated extract and a minor portion of volatile aromatics condensed to include flavor-producing volatile constituents boiling at temperatures higher and lower than that of water and to exclude noncondensable gaseous constituents. The temperatures employed to effect such separation will be dependent in great measure upon the identity of the extract being processed. For typical extract, temperatures may be employed, of say 140° F.;

(b) the aforesaid volatile fraction produced by the first step is thereafter subjected to condensation continuously, at such temperatures that the volatile flavor-producing constituents are collected as a two-phase oily-watery mixture. Advantageously, the temperatures at which this oily-watery mixture may be collected by condensation may be only moderately reduced, typically 30°–70° F. Usually, it is found that the desired condensate collected is in the neighborhood of 5–15% by weight of the extract initially introduced to the heat exchange surface;

(c) the aforesaid two-phase mixture is thereafter separated into a minor subfraction containing desirable high as well as low boiling flavor-producing constituents and a major subfraction containing mainly previously condensed water and an undesirable quantity of oily flavor-producing constituents. It is this minor subfraction which has been found offers the desirable flavor enhancement to the extract concentrate. Such separation can be carried out by azeotropic distillation of the two-phase mixture under absolute pressures of less than 1½″ of mercury at temperatures of 50°–100° F. or by any other process yielding substantially the same minor subfraction, as will be described hereinafter. The desirable subfraction which is collected comprises as a major proportion a watery phase and as a minor proportion an oily phase. This minor subfraction may be collected by condensation at temperatures of 30°–70° F. as will be described hereinafter. Preferably the minor subfraction is further subdivided by allowing the water and oily phases to separate one from another upon standing, the watery phase being continuously removed from the bottom of this separation while accumulating an oil level on the surface; upon sufficient oil accumulation, this oil is drained off separately and subsequently mixed with a quantity of suitable high boiling organic material. For the purposes of the present invention it is preferred that this minor subfraction be collected by condensation in a closed system, that is one where no external vapors are introduced to the minor subfraction.

The minor subfraction of use generally represents about 0.5–1.5% by weight of the whole extract. The specific subfraction of use is ideally recoverable by evaporation at only moderately elevated temperatures and by condensation at temperatures ranging above 30° F. and upwardly to 70° F. when employing absolute pressures in the neighborhood of less than ½ in. of Hg; however, this fraction may also be condensed at temperatures below 30° F. by means of a brine solution or other refrigerating means which, depending on the temperature of condensation, many cause icing in the collection vessel and which permit recovery of the fraction as a snow rather than liquid.

It will be recalled that the foregoing process for recovering the volatile aromatic fraction desired may be carried out under subatmospheric pressures at only moderately elevated temperatures in the initial extract concentration step; the concentrate portion may be subsequently introduced on either a continuous or batch basis to further heat exchange equipment wherein it may be caused to again travel in the form of a thin film over one or more heat exchange surfaces also maintained under subatmospheric pressures but at higher temperatures whereby the more concentrated extracts will be reduced in viscosity and thereby more effectively concentrated. Thus, evaporation temperatures above 100° F. may be practiced. It has been found useful in the present process to employ highly volatile so-called refrigerant gases, typically ammonia, which when compressed contain sufficient latent as well as sensible heat to boil the desired volatile constituents. Since the desired flavor fraction is collectable by condensation at temperatures above 30° F., a continuous heat exchange cycle employing such refrigerant gases is ideally suited to the present process; thus, after the compressed refrigerant gas has surrendered its heat to the extract concentrate, it can be employed in its liquid state to remove sensible heat as well as the heat of condensation from the distilled fraction, the heat of which can be re-used to heat the liquid refrigerant for subsequent cycles. The heat of a compressed refrigerant gas may be utilized directly to boil further quantities of extract or it may be employed indirectly through transfer to another medium such as water which could serve in boiling the extract concentrate. However, it is not intended that the present process by restricted to the use of such refrigerant gases since steam may be introduced to the heat exchange surface to effect extract concentration as well as redistillation of the two-phase oily watery mixture and since cold water can be employed to condense the minor volatile portion separated from the initial concentration step as well as the redistilled volatile fraction.

It is preferred that the noncondensables not be collected so that the redistilled condensate employed for flavor enhancement is relatively free of those materials like carbon dioxide and oxygen which impair the flavor values of the concentrate even at temperatures below 0° C. It is preferred that the noncondensables and the difficulty condensable volatile vapors be evacuated from the initial concentration of the extract in a nonoxidizing atmosphere and discarded, thereby freeing the first two-phase oily-watery mixture collected from interference with the noncondensables and highly volatile constituents. This results in a more stable concentrate fortified with the specific flavor fraction of the present invention. In this connection it its noteworthy that the extracs fortified with this flavor fraction have been characterized by improved freedom from oxidative changes and the accompanying ability to avoid use of costly nitrogen packaging.

Ideally, the specific flavor fraction may be mixed in liquid form with the concentrate thereby offering the advantages of a simple plant recirculation. However, it has been found that a rather prolonged shelf life for flavor-enhanced concentrate is achieved when the specific flavor fraction is frozen into individual portions or pieces, typically cubes or discs, which are introduced into the extract concentrate just prior to packaging and freezing of the concentrate. It appears that, by maintaining the specific flavor fraction in a frozen condition separate from the frozen concentrate, the flavor values of the product are maintained over an unusually long period of time.

The invention will now be more fully described by reference to the accompanying drawing. FIG. 1 is a schematic view of a typical plant operation for carrying out extract concentration and flavor enhancement in accordance with this invention.

Referring to FIG. 1, the system will be seen to comprise a triple effect evaporator into which a compressed refrigerant gas is introduced to supply heat for boiling the extract indirectly through recirculated water. However, the present invention is not to be restricted to the modification of the extract concentrator to be described herein since apparatus capable of employing a hot compressed refrigerant gas in a direct heat exchange relationship with boiling extract may also be employed, typically the system disclosed in U.S. Patent No. 2,570,210 to Joseph A. Cross issued October 9, 1951.

For the preferred extract concentrator of the present invention, a series of connected falling film type evaporator units 10A, 10B and 10C are employed, each unit comprising a vertical tubular evaporator having a shell and nest of tubes (not shown) which are retained by suitable upper and lower tubes sheets (not shown) in the shell. In the first effect evaporator unit 10A water is recirculated through a hot refrigerant gas condenser 20 of the shell and tube-type where the heat of the hot gas is transferred through the walls of the tubes, water heated thereby being brought into heat exchange relationship with the tubes of evaporator unit 10A by means of hot water line 21. After the water in the first effect evaporator unit 10A has been brought into heat exchange relationship with the tubes therein to elevate the extract temperature and volatilize low and high boiling aromatic constituents therein, the water is withdrawn from the top of the evaporator through pipe 22, water being recirculated to condenser 20 by means of pump 23 and pipe 24. A suitable ammonia compressor 25 communicating with ammonia condenser 20 through ammonia gas line 28 compresses ammonia vapor whereby hot ammonia gas is delivered into heat exchange relation with gas condenser 20, condensed liquid ammonia collected in condenser 20 flowing into ammonia receiver 27 through line 29. Liquid ammonia in receiver 27 is floated on ammonia line 27A to maintain an adequate supply of liquid ammonia for level control means 27B of vapor condenser 82.

Fresh percolated extract is supplied to evaporator unit 10C through a suitable feed pipe 40. Feed pipe 40 preferably is located to feed fresh extract just below the level of liquid in sump 70C. A flow control valve 12C being located in pipe 40 controlling the rate at which fresh extract is delivered to sump 70C and being operated under the control of pneumatic level control means 13C in communication with tail pipe 14C for sump 70C. Fresh extract entering the sump 70C is delivered by tail pipe 14C to circulator pump 42C which delivers a portion of fresh extract through pipe 46B for evaporation in the second effect evaporator unit 10B, a majority of the extract being delivered to the third effect evaporator unit 10C. Fresh extract entering the third effect concentrator 10C flows downwardly within each of the tubes therein (not shown), the extract being distributed in the tubes by means of a header having suitably mounted therein distributor tubes, a distributor tube being mounted at the upper extremity of each heat exchange tube for assuring uniform distribution of the extract in the form of a falling film in positive contact with the inner walls of the tube, all of which is well known to those skilled in the art, e.g., FIG. 4 of the aforesaid Cross patent.

In the system diagrammed in FIG. 1, the boiling extract vapors of the first evaporator unit 10A are brought into heat exchange relation through duct 60 with extract being circulated to the nest of heat exchange tubes in second effect evaporator 10B, and the boiling extract vapors in the second effect evaporators are delivered through duct 62 into heat exchange relationship with the nest of tubes for the third effect evaporator. Thus boiling extract vapors introduced to the shell surround the nest of heat exchange tubes therein and transfer their heat of liquefaction to extract traveling downwardly in contact with the inner walls of the heat exchange tubes in unit 10C, the concentrated extract being collected at sump 70C in the lower extremity of evaporator 10C with the vapors introduced to the shell of evaporator unit 10C being condensed therein, collected and removed from the area around the base of the heat exchange tubes through pipe 72C and delivered by vapor condensate pump 74 through line 75 to an ammonia subcooler generally shown at 76. Similarly, concentrated extract from the first effect evaporator 10A is collected in sump 70A. The extract vapors condensed in the second effect evaporator 10B are removed through pipe 72B and delivered through U-shaped vapor condensate trap 78 and pipe 80 communicating with draw-off pipe 72C through the intermediation of the pool for vapor condensate around the lower extremities of the nest of heat exchange tubes in the third effect evaporator.

In operation freshly brewed extract is admitted through control valve 12C in pipe 40 to maintain a fixed level of extract in sump 70C of the third effect evaporator unit; similarly, valve 12B is adjusted to effect a level of extract in the sump 70B of the second effect evaporator and valve 12A in line 46A maintains a suitable level of extract in sump 70A of the first effect evaporator, pneumatic level control means 13A, B and C, respectively, being employed to control the operation of valve means 12A, B and C, sensing devices for pneumatic liquid control units being in communication with tail pipes 14A, B and C, respectively, the operation of such means being well known to those skilled in the art. Thus, through the operation of the valve means just described the rate at which fresh dilute extract and portions of concentrated extract are supplied to the individual evaporator units is controlled to provide a substantially uniform level of extract in the respective sumps of the various effects.

A vacuum is drawn through lines 90B, 90C and 90B communicating with evaporator units 10B and 10C and vapor condenser 82, respectively. The lines 90B, C and D serve to remove difficultly condensable volatile flavor constituents and non-condensable gases boiling over with extract vapors. The suction drawn through lines 90B, C and D is effected by any well known steam ejection system, the design of which is well known to those skilled in the art, a three stage steam ejection system with a hogging jet being generally shown at 92.

Hence, in operation fresh dilute extract delivered to the system through pipe 40 will be evaporated and concentrated through the successive stages of evaporator units 10C, 10B and 10A and eventually delivered by circulation pump 42A through product pipe 48A to additional evaporators for further concentration and subsequent combination with other extract constituents for aromatizing the extract, as will be hereinafter described; the boiling extract vapors produced in the third effect evaporator 10C are removed therefrom through vapor duct 64 and delivered to a tube-type vapor condenser 82 in heat exchange relationship with the vapors, cold liquid ammonia circulating through the tubes of the condenser 82 bringing about condensation of the vapors around the tubes in condenser 82, wherefrom the vapors are collected at sump 84 delivered through pipe 85 to pump 86 and pipe 88 which delivers the extract vapor condensate to means for further concentration in accordance with the present invention. The extract vapors condensed in the third effect evaporator 10C and removed through pipe 72C are circulated by pump 74 through line 75 to an ammonia subcooler generally shown at 76. Liquid from ammonia receiver 27 reaches the subcooler 76 through line 27A, ammonia subcooler 76 serving to further cool liquid ammonia by having the relatively cooler waste condensate in line 75 brought into heat exchange relation with the liquid ammonia. Thus the temperature of ammonia circulated through line 77 and level control means 27B to vapor condenser 82 is lowered and the efficiency of the vapor condenser is increased. In this connection the heat transferred from extract vapors in the condenser 82 is transferred to the liquid ammonia, the latter being recirculated back to ammonia receiver 27 through suction line 27D to ammonia receiver 27.

Thus, the liquid phase recovered by the condenser 82 is essentially the vapor condensate of fresh dilute extract and is substantially free of the difficultly condensable vapors and noncondensable gases such as nitrogen, carbon dioxide and oxygen. This liquid phase is recovered in the course of initial concentration of fresh extract by subjecting the extract to reduced subatmospheric pressures generally less than 1½″ of mercury absolute and ranging typically downward to about ½″ of mercury and below; as indicated previously the fresh dilute extract is subjected to such evaporation at temperatures which will not occasion degradation of the various desirable essences evaporated but generally will be at a temperature above about 70° F. and not exceed about 140° F. The liquid phase contains various constituents (predominantly water) many of which boil at temperatures higher as well as lower than that of water. In general, this liquid phase will be recovered as a minor proportion by weight of the fresh extract being subjected to evaporation in the third effect.

This liquid phase is subjected in accordance with the present invention to a redistillation to recover a desired oily-watery fraction. Thus, the liquid phase in pipe 88 is introduced to an evaporator unit wherein it is caused to travel in the form of a thin film along a preferably elongated heat exchange surface which is in heat exchange relationship with a hot gas or liquid, typically, hot ammonia gas. One form of evaporator comprises a tube-type evaporator having a plurality of vertically arranged elongated tubes suitably nested at their upper and lower extremities and adapted to receive the liquid phase delivered thereto from pipe 88. Preferably an evaporator of the type shown in the aforesaid Cross patent is employed, a suitable distributor pipe such as that shown in FIG. 4 of Cross being located at the upper mouth of each tube to cause the liquid phase to travel uniformly down along the inside heat exchange surface thereof. Hot ammonia gas from compressor 25 is delivered through inlet pipe 114 communicating with shell 116 surrounding the nest of tubes, hot ammonia gas being thereby placed in heat exchange relation with the liquid films forming within the tubes and thereby bringing about transfer of sensible heat and latent heat of evaporation to the liquid phase; hot ammonia gas condensing around the tubes is contained within and removed from the shell as a liquid through liquid ammonia pipe 118 communicating with ammonia receiver 27. Substantially all of the low boiling constituents (relative to the boiling point of water) together with certain high boiling constituents are volatilized in the tubes and conducted through duct 120 to vapor condenser 126 wherein they are condensed. The balance of the liquid phase in the tubes which has not volatilized contains high boiling constituents which are undesirable and these materials are collected in a suitable sump generally shown as 122 and pumped as at 124 to a suitable waste. Generally the waste from the liquid phase will be a majority by weight of the liquid phase being treated in the evaporator, typically, 85–95 parts by weight of the liquid phase. Condenser 126 is of the tube-type and has the vapors condensed therein by means of liquid ammonia in the neighborhood of 30° F.; the vapors condensed around the tubes of the condenser 126 are collected as an oily-watery fraction and are removed therefrom by means of pump 130 communicating with condenser shell 132 through pipe 134. An ammonia gas line 138 connects the shell of condenser 126 with the shell of the surge drum of level control means 27B wherefrom gas is recirculated through line 27D to compressor 25. A vacuum line 140 connects the shell of condenser 126 with vapor condenser 82 from which it derives its vacuum, the latter being under negative pressure from the vacuum system generally indicated at 92. Thus, the liquid phase entering the redistillation unit is subjected to a reduced absolute pressure generally between 1½ and ½" of mercury and below. The temperature of the liquid phase entering the redistillation unit will typically be about 60° F. and generally should be at a temperature whereat low and high boiling constituents are maintained in the liquid phase. The temperature of the liquid phase in the redistillation unit should be above that temperature where, at the particular pressure employed, approximately 10% of the liquid phase will be volatilized and recovered as an oily-watery condensate fraction in condenser 126; the yield of oily-watery fraction condensate will be dependent upon a number of variables including the total area of the heat exchange surface to which the liquid phase may be exposed, the temperature on said surface, the absolute pressure existing in the redistillation unit and the duration of exposure of the liquid phase to any particular temperature. Any volatile constituents vaporized in the course of redistillation and not collected by condenser 126 will be circulated through vacuum pipe 140 to vapor condenser 82 whereby such vapors may be condensed and recycled or in the case of highly volatile or noncondensable constituents removed through vacuum line 92.

As indicated previously the discovery that the high as well as low boiling components of this oily-watery fraction are useful in enhancing an extract concentrate with a well rounded and complete flavor and aroma was to some extent unexpected since it had been previously believed that only the low boiling constituents were useful in this capacity and since the higher boiling constituents had been generally classed as a group making no desirable contribution to flavor and aroma and, indeed, detracting from over-all acceptability. The oily-watery fraction may be added back directly to the concentrate or to fresh dilute extract to which concentrate has heretofore been added, to give the concentrates a natural flavor. However, it is an advantage of the present oily-watery fraction that fresh dilute extract need not be employed in preparing suitably flavored finished concentrates and, indeed, it is a preferred practice not to employ fresh dilute extract but to add the oily-watery fraction to extract concentrate.

It will be noted from the foregoing description that the heat of the compressed refrigerant gas is employed both (1) to boil the extract and separate therefrom desired volatiles containing flavor-producing constituents which boil at temperatures above and below that of water; and (2) to distill from the two-phase oily-watery mixture recovered by condensation a fraction containing said high and low boiling flavor-producing constituents. It will also be noted that when the hot compressed refrigerant gas is brought into heat exchange relation with the extract and the extract condensate it surrenders its heat and liquefies, whereafter it is recycled to a receiver and eventually may be used to condense either the volatiles recovered by boiling the extract or the desired flavor fraction recovered upon condensation. Advantageously, therefore, the flavor fraction of use is recovered as part of a cycle wherein the refrigerant gas is also employed to concentrate the extract. By repeatedly recirculating the refrigerant the latent heat of the refrigerant in a compressed condition may be utilized to supply heat for evaporation and the liquefied refrigerant may be employed to receive heat from vapors where a vapor condensate is to recovered from the system. In practice a larger amount of oily-phase is recovered than is actually desired for use and a majority of that which is collected and used is of the watery-phase. As a consequence after a substantial portion of this oily-watery fraction is recovered that which is to be used will be separated from that which is not to be used such as by permitting the emulsion to settle in an elongated chamber and thereby separate into its respective phases which phases are then separated so that at least a majority and preferably a large majority of the fraction used will contain the constituents of the watery-phase.

While the present invention has been described with particular reference to specific examples, it is not to be limited thereby, but reference is to be had to the appended claims for a definition of its scope.

What is claimed is:

1. Process of separating and recovering from coffee extract a specific fraction of volatile constituents whose boiling points are below and above that of water, comprising separating the extract into a major concentrated extract portion and a minor volatile portion which contains said volatile flavor-producing constituents and noncondensable gaseous constituents by subjecting the extract to a high vacuum concentration operation at a temperature less than 140° F., condensing a major proportion of the volatile flavor-producing constituents as a first two-phase oily-watery mixture and evacuating uncondensed volatile constituents and noncondensable gases as a minor proportion of the volatile portion, discarding said minor proportion of the volatile portion, and thereafter distilling flavorful and aromatic mixture of said high and low boiling constituents from the resulting two-phase oily-watery mixture at a temperature approximating 50°–100° F. and an absolute pressure of less than 1½" of mercury by causing a thin film of said two-phase oily-watery mixture to travel along a heat exchange surface and condensing a minor subfraction of said mixture, a major portion of said minor subfraction being a watery-phase and a minor portion of said minor subfraction being an oily-phase.

2. A process of fortifying coffee extract with a specific fraction of volatile constituents whose boiling points are above and below that of water, comprising separating the extract into a major concentrated extract portion and a minor volatile portion which contains said volatile flavor-producing constituents and noncondensable gaseous constituents by subjecting the extract to a high vacuum concentration operation at a temperature less than 140° F., condensing a major proportion of the volatile flavor-producing constituents as a first two-phase oily-watery mixture and evacuating uncondensed volatile constituents and noncondensable gases as a minor proportion of the volatile portion, discarding said minor proportion of the volatile portion, thereafter distilling a flavorful and aromatic mixture of said high and low boiling constituents from the resulting two-phase oily-watery mixture at a temperature approximating 50°–100° F. and an absolute pressure of less than 1½″ of mercury by causing a thin film of said two-phase oily-watery mixture to travel along a heat exchange surface and condensing a minor subfraction of said mixture, a major portion of said minor subfraction being a watery-phase and a minor portion of said minor subfraction being an oily-phase, and combining said minor subfraction with extract concentrate.

3. A process of fortifying coffee extract with a specific fraction of volatile constituents whose boiling points are above and below that of water which comprises bringing the extract to a temperature of 70°–140° F. under an absolute pressure less than 1½″ of mercury in a closed system to partially concentrate said extract by separating it into a major concentrated extract portion and a minor volatile portion which contains said volatile flavor-producing constituents and noncondensable gaseous constituents, subjecting said minor volatile portion to condensation at such temperatures that the major proportion of the volatile flavor-producing constituents therein are collected as a first two-phase oily-watery mixture, evacuating uncondensed volatile constituents and noncondensable gases as a minor proportion of said minor volatile portion, discarding said minor proportion of the volatile portion, distilling a flavorful and aromatic mixture of said high and low boiling constituents from the resulting two-phase oily-watery mixture at a temperature approximating 50°–100° F. and an absolute pressure less than 1½″ of mercury by causing a thin film of said two-phase oily-watery mixture to travel along a heat exchange surface and condensing a minor subfraction of said mixture, a major portion of said minor subfraction being a watery-phase and a minor portion of said minor subfraction being an oily-phase, combining the watery-phase and a portion of the oily-phase of said condensed minor subfraction with previously concentrated extract, and thereafter packaging and freezing said combined phases of said minor subfraction.

4. A process of fortifying coffee extract with a specific fraction of volatile constituents whose boiling points are above and below that of water, which comprises bringing the extract to a temperature above about 70° F. and below about 140° F. under an absolute pressure of less than 1½″ of mercury in a closed system to partially concentrate said extract by separating it into a major concentrated extract portion and a minor volatile portion which contains said volatile flavor-producing constituents and noncondensable gaseous constituents, subjecting said minor volatile portion to condensation at such temperatures that the major proportion of the volatile flavor-producing constituents therein are collected as a first two-phase oily-watery mixture, evacuating uncondensed volatile constituents and noncondensable gases as a minor proportion of said minor volatile portion, discarding said minor portion of the volatile portion, distilling a flavorful and aromatic mixture of said high and low boiling constituents from the resulting two-phase oily-watery mixture at a temperature approximating 50°–100° F. and an absolute pressure of less than 1½″ of mercury by causing a thin film of said two-phase oily-watery mixture to travel along a heat exchange surface and condensing a minor subfraction of said mixture, a major portion of said minor subfraction being a watery-phase and a minor portion of said subfraction being an oily-phase, further concentrating said concentrated extract portion, and combining the condensed minor subfraction with said further concentrated extract portion.

5. A process according to claim 4 wherein the watery-phase and the oily-phase of said minor subfraction are separated, and thereafter combining the watery-phase and a portion of the oily-phase of said minor subfraction with said further concentrated extract portion.

6. A process according to claim 5 wherein a portion of whole extract is added to the combination of extract concentrate and said minor subfraction.

7. Continuous process for producing flavor-enhanced coffee extract by concentrating a heat sensitive extract and separating and recovering therefrom a specific fraction of volatile constitutents whose boiling points are above and below that of water, comprising utilizing the heat contained in a compressed refrigerant gas to boil the extract at relatively low temperatures of from 70°–140° F. under vacuum to partially concentrate said extract by separating it into a major concentrated extract portion and a minor volatile portion which contains volatile flavor-producing constitutents, water and noncondensable gaseous constituents, liquefying and causing the refrigerant to cool to a temperature substantially below the temperature of said minor volatile portion, using the cool liquefied refrigerant to condense a major proportion of said minor volatile portion as a first two-phase oily-watery mixture, evacuating uncondensed volatile constitutents and non-condensable gases as a minor proportion of said minor volatile portion, discarding said minor proportion of the volatile portion, utilizing the heat contained in another portion of said compressed refrigerant gas for concentrating said two-phase oily-watery mixture by distilling a flavorful and aromatic mixture of said high and low boiling constituents from the resulting two-phase oily-watery mixture at a temperature approximating 50°–100° F. and an absolute pressure of less than 1½″ of mercury by causing a thin film thereof to travel along a heat exchange surface, using a portion of said cool liquefied refrigerant to condense a minor subfraction of the constituents volatilized from said two-phase oily-watery mixture to condense a minor subfraction containing a watery phase and an oily phase, a major portion of said minor subfraction being the watery phase and a minor proportion of said minor subfraction being the oily phase, and combining the latter subfraction with a portion of said concentrated extract.

8. Continuous process for producing flavor-enhanced coffee by concentrating a heat sensitive extract and separating and recovering therefrom a specific fraction of volatile constituents whose boiling points are above and below that of water, comprising utilizing the heat contained in a compressed refrigerant gas for boiling the extract at relatively low temperatures of from 70–140° F. under vacuum to partially concentrate said extract by separating it into a major concentrated extract portion and a minor volatile portion which contains volatile flavor-producing constituents, water and noncondensable gaseous constituents, liquefying and causing the refrigerant to cool to a temperature substantially below the temperature of said minor volatile portion, introducing said liquefied refrigerant and said minor volatile portion to a heat exchanger to condense a major portion of said minor volatile portion as a first two-phase oily-watery mixture and to evaporate the liquid refrigerant, discarding uncondensed volatile constituents and said non-condensable gases as a minor proportion of said minor volatile portion, recompressing said evaporated refrigerant gas, utilizing the heat contained in said compressed refrigerant gas for concentrating said two-phase oily-watery mixture by distilling a flavorful and aromatic mixture of said high and low boiling constitutents from the resulting two-phase oily-watery mixture at a temperature approximating 50°–100° F. and an absolute pressure less than 1½″ of mercury by causing a thin film of said two-phase oily-watery mixture to travel along a heat exchange surface, and utilizing a portion of said cool liquefied refrigerant to condense a minor subfraction of the volatiles distilled from said two-phase oily-watery mixture so as to contain a watery phase as a major portion of said minor subfraction and an oily phase as a minor portion of said minor subfraction.

References Cited by the Examiner

UNITED STATES PATENTS

| | | | |
|---|---|---|---|
| 2,155,971 | 4/1939 | Houseman | 99—71 |
| 2,450,774 | 10/1948 | Zahm | 99—205 |
| 2,534,341 | 12/1950 | Cross | 99—205 X |
| 2,625,505 | 1/1953 | Cross | 99—205 X |
| 2,992,978 | 7/1961 | Kelly. | |

A. LOUIS MONACELL, *Primary Examiner.*

M. W. GREENSTEIN, *Assistant Examiner.*